Nov. 26, 1946. R. B. THOMPSON ET AL 2,411,817
PARAFFIN ALKYLATION PROCESS
Filed Sept. 30, 1943
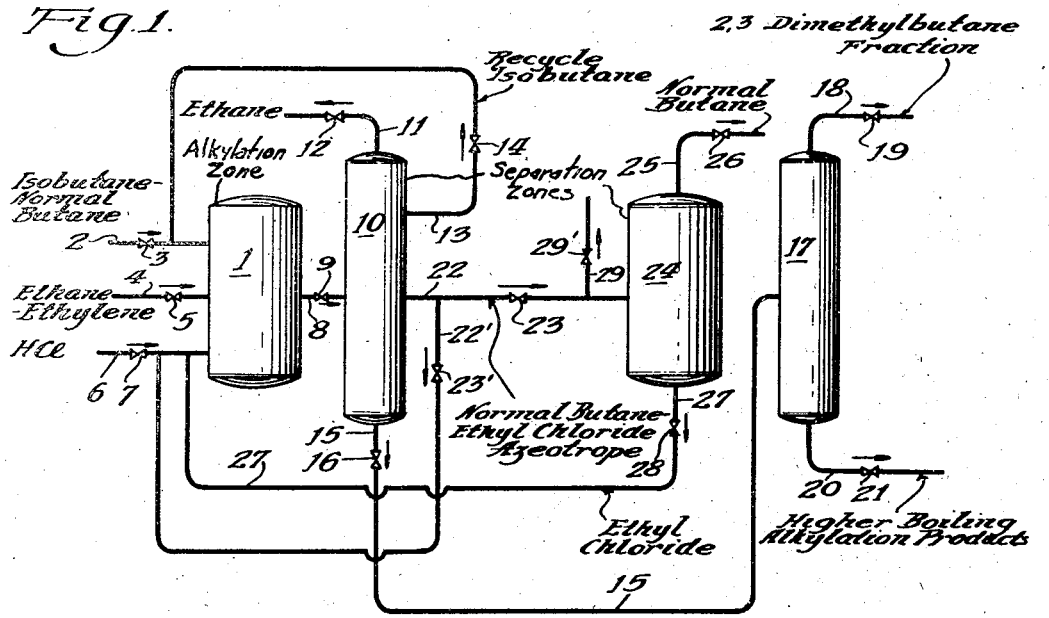
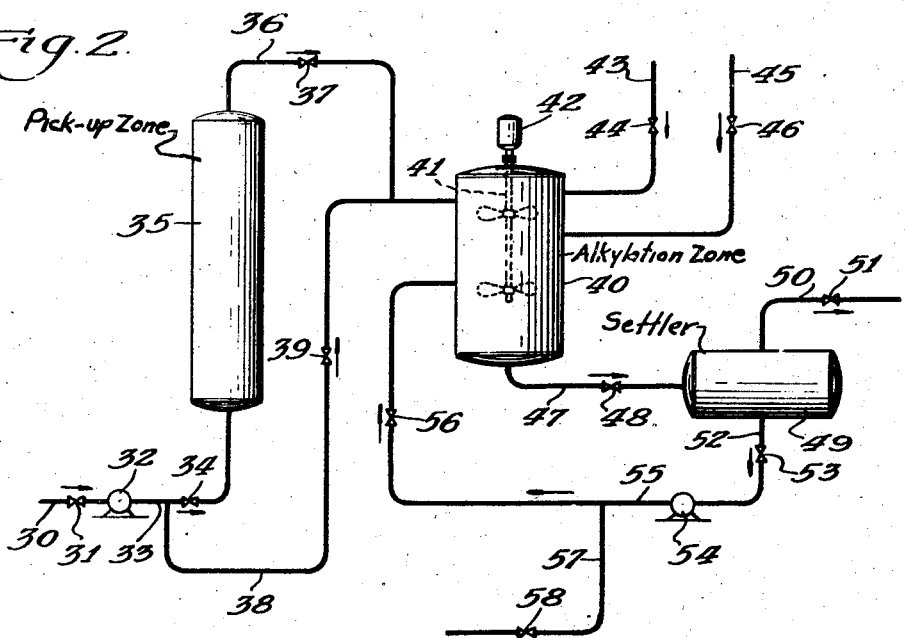
Inventors:
Ralph B. Thompson
Joseph A. Chenicek
By: Lee J. Gary
Attorney.

Patented Nov. 26, 1946

2,411,817

UNITED STATES PATENT OFFICE 2,411,817

PARAFFIN ALKYLATION PROCESS

Ralph B. Thompson and Joseph A. Chenicek, Riverside, Ill., assignors to Universal Oil Products Company, Chicago, Ill., a corporation of Delaware Application September 30, 1943, Serial No. 504,462

10 Claims. (Cl. 260—683.4)

This invention relates to the alkylation of isoparaffins with olefins in the presence of an aluminum chloride catalyst. The invention is more specifically concerned with certain improvements in the production of valuable hexanes by the alkylation of isobutane with ethylene.

It is known that valuable hexanes can be produced by the interaction of isobutane with ethylene. When this alkylation is conducted in the presence of a suitable catalyst, e. g., aluminum chloride or an aluminum chloride-hydrocarbon complex, 2,3-dimethylbutane is obtained as the principal alkylation product. This hydrocarbon has very valuable antiknock properties and is, therefore, desired for use in aviation gasoline blends or other motor fuels. It is generally desirable to employ hydrogen chloride as a promoter for the aluminum chloride or aluminum chloride-hydrocarbon complex catalyst.

From a commercial point of view, the isobutane-ethylene alkylation process employing an aluminum chloride catalyst presents a difficult problem. Since ethylene is not readily available in pure form, it is necessary to employ ethane-ethylene fractions as a source of ethylene feed. These $C_2$ hydrocarbon fractions as produced in various hydrocarbon conversion processes, e. g. thermal or catalytic cracking, may contain from about 30 to about 70 mol per cent of ethylene. If this mixture is charged directly to the alkylation zone, a gaseous fraction is separated from the alkylation products which comprises unconverted ethane and hydrogen chloride. The separation of hydrogen chloride from ethane in order to permit recycling of the catalyst promoter to the alkylation zone is a relatively inconvenient and costly procedure. In order to avoid this difficulty it has hitherto been customary to provide an ethylene concentration unit which by means of a series of fractionation steps increases the concentration of ethylene in the ethane-ethylene feed to the order of 85-95 mol per cent thereby decreasing the quantity of ethane charged to the alkylation system and minimizing the ethane-hydrogen chloride separation problem.

We have discovered that under suitable conditions substantially all of the hydrogen chloride charged to the alkylation system reacts with ethylene to produce ethyl chloride. The separation of the latter compound from unconverted ethane is a simple matter, and the ethyl chloride may be recycled to the alkylation zone thereby replacing hydrogen chloride as a promoter. We have found that, contrary to expectation, there is no net consumption of the ethyl chloride recycled to the alkylation zone. Therefore, ethyl chloride can be recycled indefinitely in the system with the addition of relatively small amounts of make-up hydrogen chloride to compensate for mechanical losses, etc.

In a broad aspect the present invention relates to the use of ethyl chloride as a promoter for aluminum chloride catalysts in the alkylation of isobutane with ethylene.

In one specific embodiment the present invention comprises alkylating isobutane with ethylene in the presence of an aluminum chloride catalyst and ethyl chloride as a promoter, separating ethyl chloride from the reaction products, recovering alkylation products of desired boiling range, and recycling said separated ethyl chloride to the alkylation step.

The term aluminum chloride catalyst as used in this specification and appended claims is intended to include aluminum chloride per se, aluminum chloride supported on various relatively inert carriers, aluminum chloride composited with other catalytic materials such as other metal halides, and aluminum chloride-hydrocarbon complexes. The preferred method of utilizing aluminum chloride to catalyze the reaction of isobutane with ethylene is in the form of a fluid aluminum chloride-hydrocarbon complex. Various complexes may be prepared by contacting olefins, aromatics, naphthenes, paraffins, or mixtures thereof with aluminum chloride under suitable reaction conditions and preferably in the presence of hydrogen chloride. It will be apparent that a wide variety of complex catalysts may be prepared dependent upon the particular hydrocarbons chosen to react with the aluminum chloride, the relative amounts of reactants, the reaction conditions, etc. In general we prefer to employ an aluminum chloride-hydrocarbon complex of the type which is formed inherently when isobutane and ethylene are contacted with aluminum chloride under alkylating conditions. The nature of our preferred catalyst will be described hereinafter in greater detail.

For further explanation of the present invention reference is now made to the drawing wherein Figure 1 is a diagrammatic flow chart of the process of the present invention and Figure 2 illustrates in detail the preferred arrangement of apparatus for conducting the alkylation step in the presence of a preferred catalyst.

Referring to Figure 1, zone 1 represents an alkylation zone of any suitable type for effecting the isobutane-ethylene alkylation in the presence of an aluminum chloride catalyst. If the catalyst comprises granular aluminum chloride or supported aluminum chloride, reaction zone 1 will usually consist of a fixed bed of the solid catalyst through which the reactants are passed under alkylation conditions of temperature, pressure, space velocity, etc. If the catalyst consists of a fluid aluminum chloride-hydrocarbon complex, reaction zone 1 will comprise suitable equipment for effecting alkylation reactions in the presence of a liquid alkylating catalyst, e. g. a mechanically agitated reaction zone, jet mixer, "time tank" provided with internal baffles and/or orifices, etc.

An isobutane fraction which ordinarily contains appreciable quantities of normal butane is charged to the alkylation zone through line 2 and valve 3. An ethane-ethylene fraction is admitted through line 4 containing valve 5. Hydrogen chloride may be introduced to alkylation zone 1 through line 6 and valve 7. In the isomerization of normal butane in the presence of AlCl$_3$—HCl it is often necessary to discard an ethane-hydrogen chloride mixture. In the present invention, however, an ethane-HCl mixture of this type can readily be supplied through line 6 without the disadvantages previously expected from such a method of operation. The reaction products are withdrawn from the reaction portion of the system and are introduced through line 8 containing valve 9 to separation zone 10 which will ordinarily comprise one or more fractionating zones equipped with the conventional condensers, receivers, etc. Unconverted ethane is withdrawn as a gas through line 11 containing valve 12 and is vented to the atmosphere. In certain cases this discarded ethane fraction may contain relatively minor amounts of hydrogen chloride. Unconverted isobutane is withdrawn from zone 10 and recycled through line 13 and valve 14 to line 2 and thence into alkylation zone 1. Alkylation products are withdrawn through line 15 containing valve 16 and are subjected to fractionation in zone 17. A lower boiling fraction comprising 2,3-dimethylbutane is recovered through line 18 and valve 19. Higher boiling alkylation products such as octanes are withdrawn through line 20 containing valve 21.

As hereinbefore described, we have found that the hydrogen chloride charged to alkylation zone 1 is substantially completely converted to ethyl chloride by reaction with a portion of the ethylene feed. Since ethyl chloride has a normal boiling point of 12.2°C., it may be condensed readily and the unconverted ethane may be vented from the system as a gas. Ethyl chloride forms an azeotrope with normal butane, however, and in some cases it will be necessary to recover ethyl chloride from the azeotropic mixture in order to recycle the same to the alkylation step without the necessity of recycling excessive amounts of normal butane. We have not observed any indications that an azeotrope is formed between isobutane and ethyl chloride. At atmospheric pressure the normal butane-ethyl chloride azeotrope contains approximately 12–13 mol per cent ethyl chloride and has a boiling point almost identical with that of pure normal butane.

The normal butane-ethyl chloride azeotrope may be withdrawn from the separation step through line 22 containing valve 23 and introduced into a separation zone 24 wherein the ethyl chloride is separated from the normal butane by some suitable means other than by distillation. The separated ethyl chloride is recycled to the alkylation zone through line 27 containing valve 28 and thence through line 6. Normal butane is withdrawn through line 25 and valve 26. By thus recycling ethyl chloride to the alkylation zone 1 it will only be necessary to add relatively minor amounts of make-up hydrogen chloride through line 6 in order to compensation for mechanical losses, certain inefficiencies in the separation steps, etc.

As an alternative method of operation all or a portion of the normal butane-ethyl chloride azeotrope may be recycled directly through line 22' and valve 23' to line 6 and thence into alkylation zone 1. This operation may be feasible when the normal butane content of the butane feed introduced to the system through line 2 is relatively low, but it will generally be necessary to remove at least a portion of the normal butane from the system by means of separation step 24, or merely by withdrawing a portion of the azeotrope from the system through line 29 and valve 29'.

Various methods may be employed in separation step 24 for resolving the normal butane-ethyl chloride azeotrope. One method which is particularly convenient consists in treating the azeotrope with a selective solvent in which the ethyl chloride is preferentially soluble. In general, polar solvents that are insoluble in butane may be employed in the extraction step. The ethyl chloride may then be recovered from the solvent by distillation. Suitable polar solvents comprise the alcohols such as methyl alcohol, ethyl alcohol, isopropyl alcohol, or mixtures thereof. Polyhydroxy alcohols such as ethylene glycol or propylene glycol are also suitable. Excellent results are also obtainable using aqueous solutions of the alcohols, particularly ethyl alcohol. As another possible method of separating ethyl chloride, the azeotrope may be contacted with a dehydrohalogenating catalyst whereby to decompose the ethyl chloride to ethylene and hydrogen chloride. The ethylene and hydrogen chloride are separated from normal butane and may be recycled directly to the alkylation zone or if desired may be recombined in the presence of a suitable hydrohalogenation catalyst to form ethyl chloride which is then returned to the alkylation step.

In starting up an alkylation process of the present type two general methods of operation may be employed. Obviously, it is possible to charge ethyl chloride directly to the alkylation zone as a promoter for the aluminum chloride catalyst and when the system contains sufficient ethyl chloride, the addition of make-up hydrogen chloride may be started. In another method of operation, only hydrogen chloride is charged to the system initially. As the alkylation reaction proceeds the hydrogen chloride added is almost completely converted to ethyl chloride which is recovered in the manner hereinbefore described and recycled to the alkylation step.

Figure 2 illustrates a preferred arrangement of apparatus for effecting the alkylation reaction. Zone 35 is a pickup or saturation zone which contains a bulk supply of aluminum chloride usually in the form of granular particles. The isobutane charge is introduced at least in part through line 30 containing valve 31, pump 32, and line 33 containing valve 34 to the pickup zone 35. This portion of the isobutane charge dissolves aluminum chloride during its passage through zone 35 and the effluent stream removed through line 36 and valve 37 is substantially saturated with aluminum chloride. Another portion of the isobutane charge is passed through line 38 and valve 39 and is commingled with the effluent solution from zone 35 as shown. The mixture is charged to alkylation zone 40. If desired all of the isobutane charge may pass through zone 35.

The ethane-ethylene charge is introduced to alkylation zone 40 through line 43 containing valve 44. Hydrogen chloride and recycled ethyl chloride are added through line 45 containing valve 46. Alkylation zone 40 is a mechanically agitated zone provided with stirring device 41 driven by motor 42. During the alkylation reaction in zone 40 the fresh aluminum chloride introduced from pickup zone 35 is converted to a fluid aluminum chloride-hydrocarbon complex. The effluent mixture of catalyst and reaction products is passed through line 47 and valve 48 to settler 49 from which an upper hydrocarbon layer is withdrawn to further separation steps through line 50 containing valve 51 and a lower catalyst layer is recycled to the alkylation zone through line 52 containing valve 53, pump 54, and line 55 containing valve 56. A portion of the used catalyst may be withdrawn from the system through line 57 containing valve 58.

In the system described in connection with Figure 2 it will be apparent that the aluminum chloride content of the aluminum chloride-hydrocarbon complex catalyst in alkylation zone 40 may be controlled accurately by the addition of regulated amounts of aluminum chloride from pickup zone 35. The amount of aluminum chloride carried over from zone 35 is dependent upon the proportion of isobutane charge passed through the zone and also upon the temperature therein. For optimum production of 2,3-dimethylbutane it is desirable to maintain the aluminum chloride content of the complex catalyst within the range of from about 60 to about 85% by weight based on $Al_2O_3$ analysis. The alkylation reaction may be conducted at temperatures of from about 50° F. to about 170° F., preferably 100° F. to 140° F., and under sufficient pressure to maintain at least a portion of the reactants in the liquid phase. It is also desirable to maintain an appreciable mol excess of isobutane over ethylene in the hydrocarbons charged to the alkylation step, e. g. from about 4:1 to about 20:1.

The following experimental data are presented in order to demonstrate the nature of the present invention. It is by no means intended, however, to limit the scope of the invention by the details of these examples. All of the experimental data described in these examples were obtained in an apparatus substantially of the type shown in Figure 2 of the drawing. Suitable stabilization equipment was provided for treatment of the hydrocarbon products withdrawn through line 50.

*Example I*

During a 48 hour period isobutane was alkylated with ethylene in the presence of the aluminum chloride-hydrocarbon complex formed in situ. The charging stock to the alkylation zone had the following composition on a mol per cent basis:

| | Per cent |
|---|---|
| Propane | 1.3 |
| Isobutane | 59.5 |
| n-Butane | 24.8 |
| Pentanes | 0.2 |
| Ethylene | 12.1 |
| Hydrogen chloride | 2.1 |

A volume ratio of catalyst to hydrocarbon in the alkylation zone of 0.68 was maintained. A space time (defined as volume of catalyst in the reaction zone divided by the volume rate per minute of hydrocarbon feed) of 28 minutes was employed at a temperature of 140° F. and a pressure of 250 pounds per square inch gage. The pickup zone was operated at 150° F. and 250 pounds per square inch gage.

During this operation a yield of hexanes of 193 weight per cent based on the ethylene charged was obtained. The hexane cut had a chlorine content of 0.0002 weight per cent.

In an attempt to obtain a weight balance on the hydrogen chloride charged to the system, the effluent gas from the stabilization step was scrubbed with a measured volume of sodium hydroxide and the excess base titrated with hydrochloric acid. In three such determinations made during the run the hydrogen chloride in the effluent gas was found to be only 0.01–0.02 gram per hour whereas the rate of introduction of hydrogen chloride to the alkylation system was approximately 1.8 grams per hour. From these results it is apparent that most of the hydrogen chloride was converted to organic chlorine containing compounds during the alkylation reaction.

*Example II*

In a further attempt to explain the apparent consumption of hydrogen chloride observed in Example I similar alkylation runs were made and the distribution of chlorine was determined in the various products. The results of the chlorine determinations are summarized as follows:

*Distribution of chlorine in ethylene-isobutane alkylation*

| | Period number | | |
|---|---|---|---|
| | 1 | 2 | 3 |
| Cl in stabilizer overhead..........grams.. | 64.92 | 60.92 | 60.87 |
| Cl in C₄ from alkylate..............do.... | 2.78 | 1.48 | ...... |
| Cl in total alkylate................do.... | 0.06 | 0.12 | ...... |
| Total Cl recovered................do.... | 67.76 | 62.52 | ...... |

It will be evident that most of the chlorine was found in the lower boiling compounds removed overhead during the stabilization step. By means of a careful low temperature Podbielniak fractionation, the chlorine in the stabilizer overhead was found to be present as ethyl chloride.

Further evidence that ethyl chloride is formed during the reaction was obtained in a series of runs in which the amount of hydrogen chloride charged to the process was varied. As the rate of introduction of hydrogen chloride was increased the yield of alkylate based on the ethylene charged decreased thus indicating substantial reaction of the hydrogen chloride with ethylene. Yields calculated on the basis of ethylene available after reaction with hydrogen chloride were approximately the theoretical yields.

*Example III*

In order to demonstrate that ethyl chloride can be recycled to the alkylation zone and that it will serve as a promoter for the aluminum chloride-hydrocarbon complex catalyst without net consumption, the following test was made employing substantially the same apparatus and method of operation as described in connection with Example I.

The combined feed charged to the alkylation zone had the following mol per cent composition:

| | Per cent |
|---|---|
| Propane | 1.3 |
| Isobutane | 60.0 |
| n-Butane | 24.8 |
| Pentane | 0.2 |
| Ethylene | 12.6 |
| Ethyl chloride | 1.1 |

The reaction was carried out at a temperature of 140° F., a pressure of 250 pounds per square inch gage, a space time of 29 minutes, and a catalyst to hydrocarbon volume ratio of about 0.7. The pertinent results over 322 hours of operation are summarized as follows:

| | Period No. | | | |
|---|---|---|---|---|
| | 1 | 2 | 3 | 4 |
| Length of period_____hours__ | 48 | 48 | 42 | 48 |
| Cumulative time_____do____ | 93 | 131 | 250 | 322 |
| Yield of alkylate, weight per cent of C$_2$H$_4$ charged_____ | 304 | 304 | ¹ 214 | ¹ 228 |
| Volume per cent hexanes in alkylate_____ | 73.6 | 77.4 | 79.9 | 80.4 |
| Chlorine, weight per cent of C$_8$ product_____ | 0.0022 | 0.0014 | 0.0017 | 0.0014 |
| Ethyl chloride weight balance: | | | | |
| C$_2$H$_5$Cl charged_____grams__ | _____ | 75.6 | 64.8 | 74.8 |
| C$_2$H$_5$Cl recovered_____do____ | _____ | 75.2 | 68.5 | 76.9 |

¹ Yields uncertain because of operating difficulties.

The 304 weight per cent alkylate yields in periods 1 and 2 is approximately the theoretical yield of 307 weight per cent indicating that all of the ethylene charged was available for alkylation. This is in marked contrast to the results obtained with hydrogen chloride as a promoter in which case a portion of the ethylene reacts with the hydrogen chloride charged and is, therefore, unavailable for alkylation.

The calculation of the ethyl chloride recovered was based upon the chlorine analysis of the stabilizer overhead assuming total recovery of unreacted hydrocarbons. The ethyl chloride charged to the reaction was calculated from the chlorine analysis of the entering charging stock. Within the experimental error of the operating technique and the analytical methods, the data indicate that there is no appreciable consumption of ethyl chloride during the reaction. The fact that only traces of ethane, if any, are found in the stabilizer overhead leads to the conclusion that consumption of ethyl chloride by halogen exchange with isobutane does not occur to any great extent. It will be apparent that in continuous operation on a commercial scale ethyl chloride lost by mechanical means, etc. can be replaced by the addition of a small amount of hydrogen chloride to the system.

We have discovered that an ethyl chloride concentration within the range of from about 0.6 mol percent to about 2.5 mol percent of the hydrocarbons charged is required for promoting the alkylation of isobutane with ethylene.

It will be apparent that the process of our invention wherein ethyl chloride is formed in situ by the reaction of hydrogen chloride with ethylene and is then recycled to the reaction zone where it functions as a promoter results in drastic economies in equipment cost and operating expenditure in the commercial isobutane-ethylene alkylation process. When ethyl chloride is employed as a promoter it is not necessary to provide a concentration system for the ethylene-ethane feed stock since any ethane present in the feed can be separated from ethyl chloride after alkylation of the ethylene. The recovery of ethyl chloride from its azeotrope with normal butane is a relatively simple matter and can generally be accomplished with no more difficulty than the hydrogen chloride-ethane separation step which was previously considered necessary.

An additional advantage attendant upon the use of ethyl chloride as a promoter for aluminum chloride alkylation catalysts, particularly the aluminum chloride-hydrocarbon complex catalysts, is the low corrosion rate. When hydrogen chloride is employed as a promoter there is often a pronounced tendency toward corrosion of reaction equipment dependent upon temperature of operation and concentration of hydrogen chloride.

We claim as our invention:

1. An alkylation process which comprises introducing isobutane and an ethane-ethylene fraction to a reaction zone and therein reacting a substantial portion of the ethylene with isobutane in the presence of an aluminum chloride catalyst, supplying to said zone an amount of hydrogen chloride not substantially in excess of that which will react with the remainder of said ethylene and therein reacting substantially all of the hydrogen chloride with ethylene to form ethyl chloride in the reaction zone, removing the reaction products from said zone and separating ethyl chloride from the hydrocarbon alkylate and the ethane content of said fraction, and recycling thus separated ethyl chloride to the reaction zone, the amount of ethyl chloride formed in and recycled to said zone being sufficient to promote the isobutane alkylating reaction therein.

2. An alkylation process which comprises introducing isobutane and an ethane-ethylene fraction to a reaction zone and therein reacting a substantial portion of the ethylene with isobutane in the presence of an aluminum chloride catalyst, supplying to said zone an amount of hydrogen chloride not substantially in excess of that which will react with the remainder of said ethylene and therein reacting substantially all of the hydrogen chloride with ethylene to form ethyl chloride in the reaction zone, removing the reaction products from said zone and separating ethyl chloride from the hydrocarbon alkylate and the ethane content of said fraction, recycling thus separated ethyl chloride to the reaction zone, and regulating the amount of ethyl chloride recycled and the amount of hydrogen chloride introduced to said zone to maintain the ethyl chloride concentration in the reaction zone within the range of from about 0.6 to about 2.5 mol percent of the hydrocarbon reactants charged to said zone.

3. An alkylation process which comprises introducing an ethane-ethylene fraction and a heavier fraction containing iso and normal butanes to a reaction zone and therein reacting a substantial portion of the ethylene with isobutane in the presence of an aluminum chloride catalyst, supplying to said zone an amount of hydrogen chloride not substantially in excess of that which will react with the remainder of said ethylene and therein reacting substantially all of the hydrogen chloride with ethylene to form ethyl chloride in the reaction zone, removing the reaction products from said zone and separating ethyl chloride therefrom in the form of an azeotrope with normal butane, and recycling at least a portion of the ethyl chloride content of said azeotrope to the reaction zone, the amount of ethyl chloride formed in and recycled to said zone being sufficient to promote the isobutane alkylating reaction therein.

4. The process as defined in claim 3 further characterized in that said portion of the ethyl chloride is recycled to the reaction zone as an azeotrope with normal butane.

5. The process as defined in claim 3 further characterized in that said portion of the ethyl chloride is separated from the normal butane content of said azeotrope prior to its recycling to the reaction zone.

6. The process of claim 1 wherein the essential active ingredient of said catalyst consists of aluminum chloride.

7. The process of claim 1 wherein said catalyst consists essentially of an aluminum chloride-hydrocarbon complex.

8. The process of claim 1 wherein said catalyst consists essentially of an aluminum chloride-hydrocarbon complex formed by contacting isobutane and ethylene with aluminum chloride under alkylating conditions.

9. The process of claim 3 wherein said normal butane-ethyl chloride azeotrope is extracted with a solvent in which ethyl chloride is preferentially soluble and ethyl chloride is subsequently separated from the extract and recycled to the reaction zone.

10. The process of claim 3 wherein said normal butane-ethyl chloride azeotrope is extracted with an alcohol in which the ethyl chloride is preferentially soluble and ethyl chloride is subsequently separated from the alcoholic extract by distillation and recycled to the reaction zone.

RALPH B. THOMPSON.
JOSEPH A. CHENICEK.